(12) United States Patent
Lai (10) Patent No.: US 10,123,387 B2
(45) Date of Patent: Nov. 6, 2018

(54) LIGHTING STRING DEVICE, LIGHTING STRING LOCATION IDENTIFYING SYSTEM, AND LIGHTING STRING LOCATION IDENTIFYING METHOD THEREOF

(71) Applicant: POWER MOS ELECTRONICS LIMITED, Kowloon (HK)

(72) Inventor: Cheng-Chang Lai, Taipei (TW)

(73) Assignee: POWER MOS ELECTRONICS LIMITED, Kowloon (HK)

(*) Notice: Subject to any disclaimer, the term of this patent is extended or adjusted under 35 U.S.C. 154(b) by 215 days.

(21) Appl. No.: 15/014,769

(22) Filed: Feb. 3, 2016

(65) Prior Publication Data
US 2017/0094745 A1    Mar. 30, 2017

(30) Foreign Application Priority Data
Sep. 25, 2015  (CN) .......................... 2015 1 0623396

(51) Int. Cl.
*H05B 33/08* (2006.01)
*H05B 37/02* (2006.01)

(52) U.S. Cl.
CPC ..... *H05B 33/0869* (2013.01); *H05B 33/0845* (2013.01); *H05B 37/0245* (2013.01); *H05B 37/0263* (2013.01); *Y02B 20/42* (2013.01); *Y02B 20/48* (2013.01)

(58) Field of Classification Search
CPC ............ H05B 33/0869; H05B 33/0845; H05B 33/08; H05B 33/08698; H05B 37/02; H05B 37/0263; H05B 37/0272; H05B 37/0245; Y02B 20/42; Y02B 20/48
See application file for complete search history.

(56) References Cited

U.S. PATENT DOCUMENTS

| | | | |
|---|---|---|---|
| 2012/0062123 A1* | 3/2012 | Jarrell | H05B 37/0245 315/131 |
| 2012/0098445 A1* | 4/2012 | Park | H05B 37/0272 315/193 |
| 2012/0161642 A1* | 6/2012 | Kim | H05B 37/0254 315/130 |
| 2013/0134891 A1* | 5/2013 | Woytowitz | H05B 37/02 315/201 |
| 2013/0320862 A1* | 12/2013 | Campbell | H05B 37/02 315/152 |

(Continued)

*Primary Examiner* — Thai Pham
(74) *Attorney, Agent, or Firm* — Chun-Ming Shih (57) ABSTRACT

The present invention discloses a lighting string device, lighting string location identifying system, and lighting string location identifying method thereof. The aforementioned lighting string device includes a lighting string controller and a plurality of lighting units. Each one of the plurality of lighting units includes a lighting portion and a controlling chip. The driving end of the controlling chip is connected to the lighting portion, and the controlling end and power end of the controlling chip is connected to the lighting string controller through the power line. When the controlling chip acquired controlling command information transmitted by the lighting string controller through the power line, the controlling chip compares the controlling command information and the address code, and determines whether to drive the lighting portion or not according to the comparison result.

10 Claims, 5 Drawing Sheets

(56) References Cited

U.S. PATENT DOCUMENTS

| | | | |
|---|---|---|---|
| 2014/0184100 A1* | 7/2014 | Yamada | H05B 37/0245 |
| | | | 315/297 |
| 2015/0145421 A1* | 5/2015 | Chung | H05B 37/0227 |
| | | | 315/158 |
| 2015/0173156 A1* | 6/2015 | Pedersen | H05B 37/0272 |
| | | | 315/151 |
| 2016/0234906 A1* | 8/2016 | Hidaka | H05B 37/0227 |
| 2016/0345415 A1* | 11/2016 | Harbers | H04L 12/2809 |

* cited by examiner

LIGHTING STRING DEVICE, LIGHTING STRING LOCATION IDENTIFYING SYSTEM, AND LIGHTING STRING LOCATION IDENTIFYING METHOD THEREOF

BACKGROUND OF THE INVENTION

1. Field of the Invention

The present invention provides a lighting string device, lighting string location identifying system and lighting string location identifying method thereof, and more particularly, a lighting string location identifying system and method thereof, which can use a central controller to control the light colors and identify a location of each lighting unit of the lighting string device.

2. Description of the Prior Art

A prior art lighting string device (such as a Christmas light) usually connects the control pin of each lamp to a controlling end of a control circuit, which can centrally control the lighting variation of the lighting string. However, this device can only turn on/off all the lighting units (lamp or LED lamp) at the same time with no other lighting variations.

In order to solve the technical problem stated above, another prior art lighting string device disposes a controlling chip in each lamp and has the lighting variation commands programmed into the controlling chip so as to let each lamp operate according to the commands. However, since each lamp operates independently, it is not possible to adjust and arrange the lighting effects of all lighting units with a single controller.

To solve the problem described above, another prior art lighting string device uses a shifting circuit to turn on/off each lighting unit. For example, in the U.S. Pat. No. 8,928,233 titled "Light emitting diode control circuit with carrier signal control and package structure for the same and system for the same", the counting and shift-registering unit 110 keeps doing adding operation to generate serial codes (such as 0001, 0002, 0003 . . . ), then provides the serial codes for controlling the on/off state of each light emitting diode 40. Since each lighting unit is controlled by the serial codes generated by the counting and shift-registering unit 110, each lighting unit has to be arranged and assembled according to the order of the serial code. When one lighting unit is failed to appear in that order, the whole operation of the lighting units could function abnormally.

People skilled in the art should understand that, the above-mentioned patent is not applicable in a real lighting string assembling process because many factors, such as a defective lamp, a bundled LED lamp, and erroneous lamp feeding and assembling, could affect the process of connecting each lamp to the lighting string.

As mentioned above, it is advantageous to provide a means which can use a central controller to control all the lamps in a lighting string.

SUMMARY OF THE INVENTION

In order to solve the above-mentioned problem, it is an object of the present invention to provide a lighting string device which can be programmed by a central controller, and an identification system which can be used for identifying each lighting unit of the lighting string device.

To achieve the above object, the present invention discloses a lighting string device. The lighting string device further comprises a lighting string controller and a plurality of lighting units. Each lighting unit comprises a lighting portion and a controlling chip including an address code. A driving end of the controlling chip is connected with the lighting portion, and a controlling end and a power end of the controlling chip are connected to the lighting string controller through a power line. The controlling chip acquires controlling command information transmitted by the lighting string controller through the power line, compares the controlling command information and the address code so as to determine whether to drive the lighting portion or not.

To achieve the above object, the present invention discloses a lighting string location identifying system for identifying locations of the lighting units of the lighting string device. The system further comprises at least one light sensor configured to detect a lighting variation of the lighting unit; and an identification device connected with the light sensor and the lighting string controller. The identification device divides the address code required for identifying into a plurality segments, and transmits the plurality of segments to the lighting units by the lighting string controller. The identification device further acquires a lighting variation of the lighting unit through the light sensor and provides location information of the lighting unit.

To achieve the above object, the present invention discloses a lighting string location identifying method for identifying locations of the lighting units of the lighting string device. The method comprises: enabling a light sensor to detect a lighting variation of each one of the plurality of lighting units; dividing the address code required for identifying into a plurality of segments; transmitting each one of the plurality of segments to each one of the plurality of lighting units by the lighting string controller, and acquiring the lighting variation of each one of the plurality of the lighting units through the light sensor and providing location information thereof.

As mentioned above, the present invention discloses a lighting string device using a lighting string controller to centrally transmit control commands to each lighting unit for lighting control, thereby solving the deficiency of lacking lighting variations of prior art lighting string devices.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DETAILED DESCRIPTION OF THE PREFERRED EMBODIMENT

The following description is about embodiments of the present invention; however it is not intended to limit the scope of the present invention.

Figure 1:
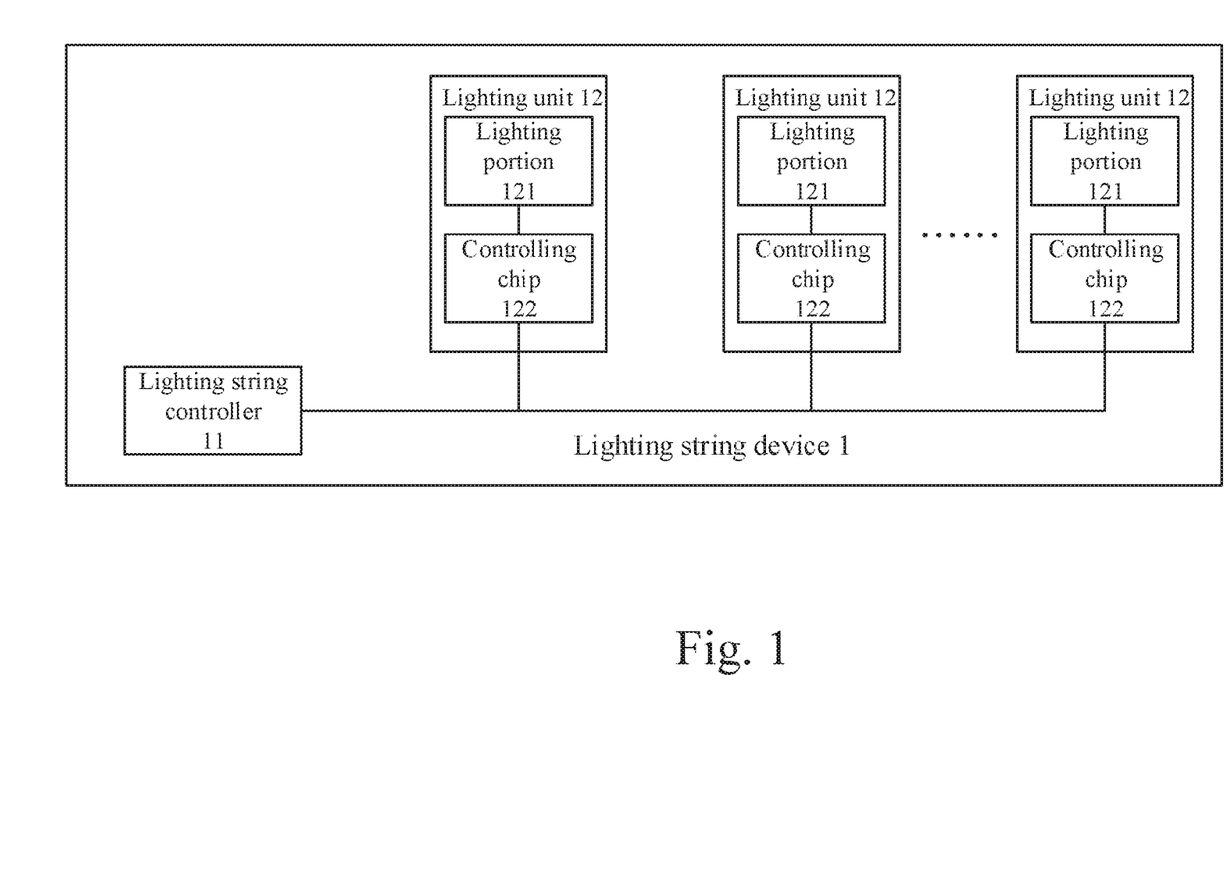
FIG. 1 illustrates a block diagram of an embodiment of a lighting string device of the present invention.

Please refer to FIG. 1 for a block diagram of an embodiment of a lighting string device 1 of the present invention. The lighting string device 1 comprises a lighting string controller 11 and a plurality of lighting units 12. Each lighting unit 12 comprises a lighting portion 121 and a controlling chip 122, wherein the controlling chip 122 includes an address code, a driving end (output port) of the controlling chip 122 is connected with the lighting portion 121, a controlling end (input end) and a power end of the controlling chip 122 is connected to the lighting string controller 11 through the power line, wherein the controlling chip 122 acquires controlling command information transmitted by the lighting string controller 11 through the power line, compares the controlling command information and the address code so as to determine whether to drive the lighting portion 121 or not. Each lighting unit 12 can be connected with one another in series or in parallel (FIG. 1).

In another embodiment, the lighting portion 121 comprises a red lighting portion 121, a green lighting portion 121, or a blue lighting portion 121, wherein the controlling command information further comprises a lighting command. In another embodiment, the lighting portion 121 is a light emitting diode (LED). In operation, the controlling command information transmitted by the main controller comprises an address code and lighting command. Therefore, when a designated lighting unit 12 determines that the address code included in the controlling command information matches its identification code, the lighting unit 12 will configure the operation of the lighting portion 121 according to the lighting command. The address code is hard-wired to the electrically-erasable programmable read-only memory (EEPORM) of the controlling chip 122. The LED can be packaged with bullet head type or surface mount device (SMD) type of package. For example, the lighting portion 121 is a LED emitting red, blue and green lights and can be configured to emit any one of the colors, when the LED is required to emit red light, the lighting string controller 11 can send out a lighting command of RGB (1, 0, 0) to the controlling chip 122, then the controlling chip 122 only enable the red lighting portion of the LED when it receives the lighting command.

Figure 2:
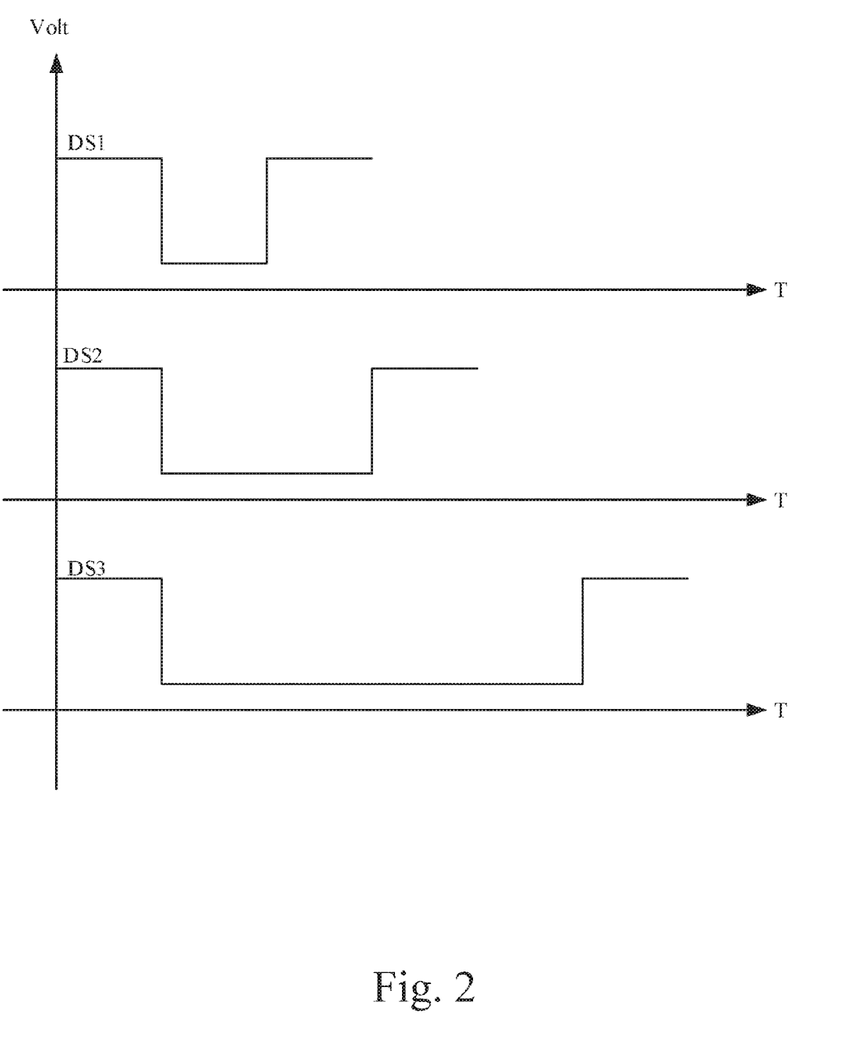
FIG. 2 illustrates electrical signal diagram of a control command.

In another embodiment of the present invention, the controlling chip 122 determines a difference of the potential to identify the power signal and the controlling command information from the power line. In another embodiment of the present invention, the controlling command information is encoded according to the time interval of the power signal. For example, the electrical signal transmitted on the power line and the corresponding digital signal is illustrated in Table. 1 and FIG. 2:

| Digital signal | Electrical signal |
| --- | --- |
| Logic"0" (DS1) | (1) high potential for encoding sample: 5 V, low potential for encoding sample: 3.6 V, interval: 5 us (2) at least 5 us interval between 2 low potentials |
| Logic"1" (DS2) | (1) high potential for encoding sample: 5 V, low potential for encoding sample: 3.6 V, interval: 5 us (2) at least 5 us interval between 2 low potentials |
| Stop code (DS3) | (1) high potential for encoding sample: 5 V, low potential for encoding sample: 3.6 V, interval: 20us (2) at least 5 us interval between 2 low potentials |

Table 1

Figure 3:
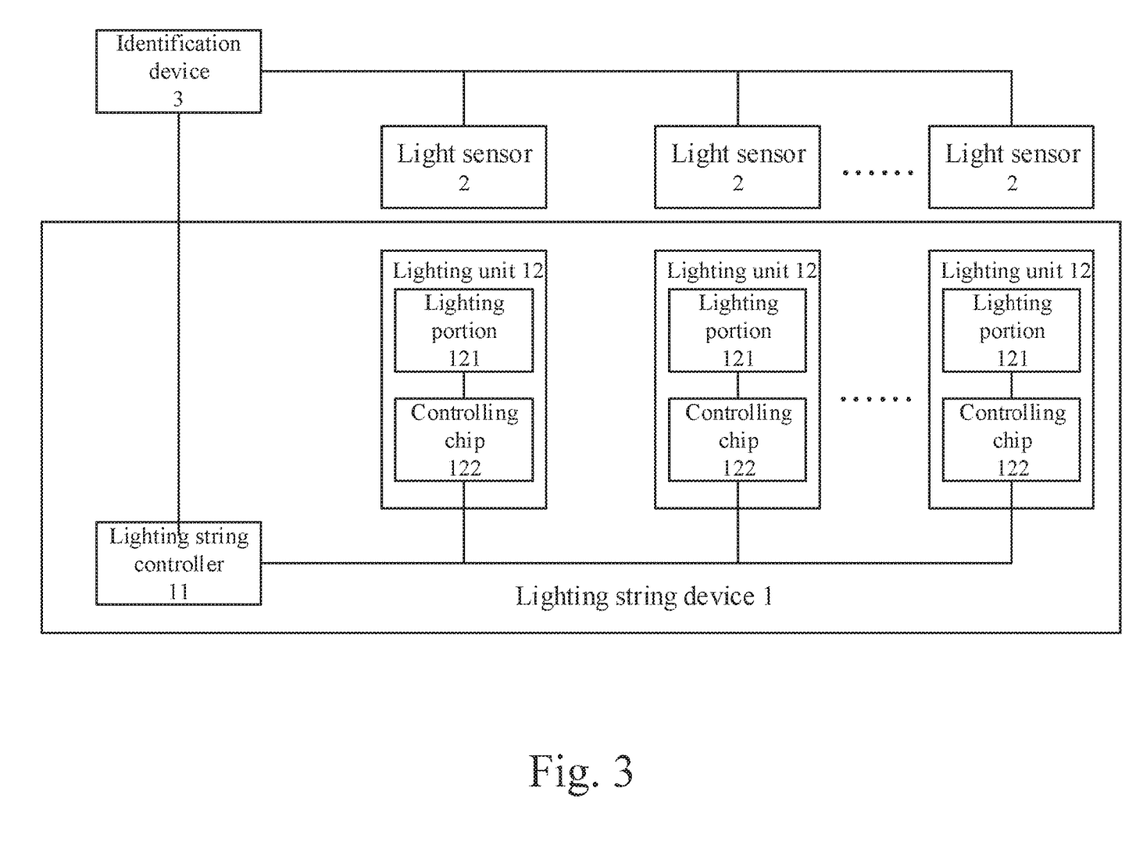
FIG. 3 illustrates a view of another embodiment of a lighting string location identifying system of the present invention.

Please refer to FIG. 3 for a system view of another embodiment of a lighting string location identifying system of the present invention. The system can be used for identifying a location of each lighting unit 12 of the lighting string device 1. The system comprises at least one light sensor 2 configured to detect a lighting variation of the lighting unit 12; and an identification device 3 connected with the light sensor 2 and the lighting string controller 11. The identification device 3 divides the address code required for identifying into a plurality segments, and transmits the plurality of segments to the lighting units 12 by the lighting string controller 11. The identification device further acquires a lighting variation of the lighting unit 12 through the light sensor 2 and provides location information of the lighting unit 12.

The light sensor 2 can be a photodiode or a camera device. The identification device 3 can be realized by a computing device, a programmable digital circuit, or a micro-controller circuit. The controlling chip and the lighting string controller can be a programmable digital circuit or a micro-controller.

Figure 4:
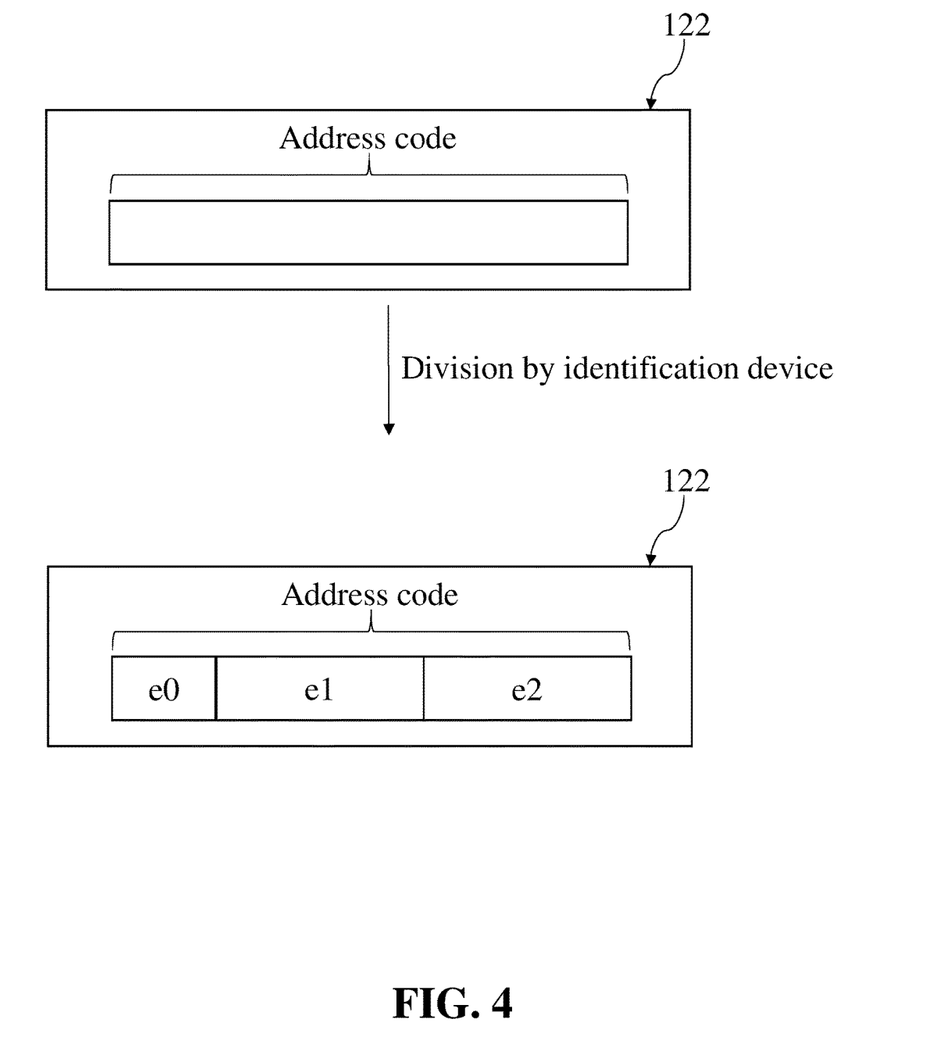
FIG. 4 illustrates division of the address code of the controlling chip.
Figure 5:
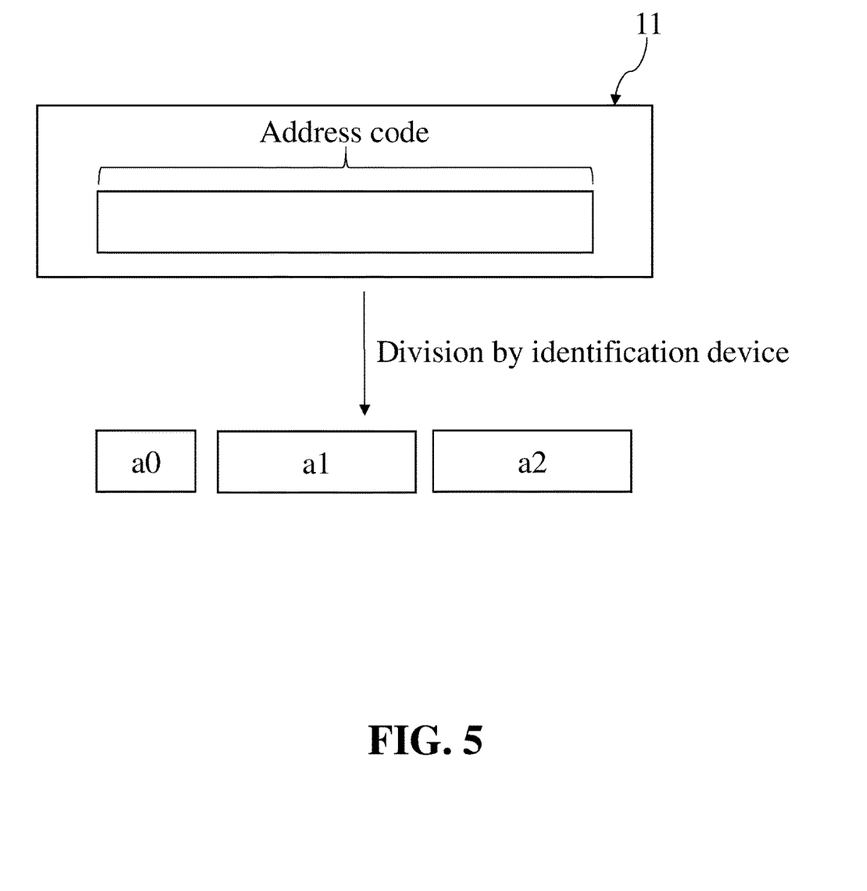
FIG. 5 illustrates division of the address code in the controlling command information.

In a real assembling process, the lighting string device 1 cannot be assembled according to the address code of each lighting unit 12, so the locations of the lighting units 12 in the lighting string device 1 could be randomly distributed. To solve the above mentioned problem, it is an object of the lighting string location identifying system of the present invention to identify the address code of each lighting unit 12 in the lighting string. For example, assuming that the lighting unit 12 comprises an address code containing 20 bits, the present invention provides a fast matching mode to identify the location of each lighting unit 12. First, the identification device 3 divides each address code of the lighting unit 12 into N segments (in this embodiment, N=3), that is segment e0 (4 bit), segment e1 (8 bit), and segment e2 (8 bit) (FIG. 4). In contrast, the address code of controlling command information is also divided into three segments, that is segment a0 (4 bit), segment a1 (8 bit), and segment a2 (8 bit) (FIG. 5). At this time, the identification device 3 transmits the segments according to their weighting values (For example, from segment a2 having low weighting value to segment a0 having high weighting value), then identifies a lighting variation of each lighting unit 12 by the light sensor 2 after transmission, and determines whether to transmit the next segment. For example, the lighting string controller 11 can transmit the segment a2 having low weighting value to the controlling chip 122, if no match is found, then the lighting string controller 11 can transmit the segment a2 and the segment a1 for identification.

In another embodiment, the identification device 3 can uses the following rules for identification:

If e2=a2 or e2=0, then it is determined that the address code of this segment matches the address code corresponding to the controlling chip 122.

If e1=a1 or e1=0, then it is determined that the address code of this segment matches the address code corresponding to the controlling chip 122.

If e0=a0 or e0=0, then it is determined that the address code of this segment matches the address code corresponding to the controlling chip 122.

For other conditions, it is determined that the address code of this segment does not match the address code corresponding to the controlling chip 122. Furthermore, if any segment of the three segments corresponds to all "0" command, then the system default command matched the address code. For example, the address code "0000" "00000000" "00000001" matches the address code "0010" "00001000" "00000001". Therefore, when the 8-bit segment having low weighting value is found to be matched, then the address codes are matched as long as the first 12 bits are all "0".

Further explanation, the identification device can set the identification process according to the number of the address codes. For better understanding, in a decimal system, the fast matching mode of the identification device 3 first identifies two address code having the same low weighting value (For example, two of the three address codes of 15, 13, 23 have the same low digit 3), so the identification device 3 will find address codes "13" and "23", then identifies the high weighting value (in this example: 1 and 2 respectively). Furthermore, if the identification device identifies that there is only one low weighting value (3 in this case) in the address codes (such as 13, 15), then the identification device can only identify the low weighting value of the address code "13".

The identification device 3 further stores the location information and the corresponding address code (Table. 2) of each lighting unit 12 in to the memory of the lighting string controller 11. Table. 3 shows the relation between the lighting commands and the light colors. When the lighting string controller 11 needs to set the lighting unit 12 at location L2 to emit yellow light, it transmits controlling command information shown in Table. 4 to the power line. The lighting unit 12 at L2 receives the command and drives the lighting portion 121 to emit yellow light.

TABLE 2

| Location | Address code |
|---|---|
| L0 | 0101-11011010-00100001 |
| L1 | 0101-11011010-10011000 |
| L2 | 0101-11011010-00001001 |

TABLE 3

| Light Color | Lighting Command RGB(X, X, X) |
|---|---|
| None | RGB(0, 0, 0) |
| Blue | RGB(0, 0, 1) |
| Green | RGB(0, 1, 0) |
| Cyan | RGB(0, 1, 1) |
| Red | RGB(1, 0, 0) |
| Red Purple | RGB(1, 0, 1) |
| Yellow | RGB(1, 1, 0) |
| White | RGB(1, 1, 1) |

TABLE 4

| Address Code | Lighting code |
|---|---|
| 0101-11011010-00001001 | 110 |

In another embodiment the present invention further provides a lighting string location identifying method for identifying the location of each lighting unit of the lighting string device, the method comprises the following steps:

S101: enabling a light sensor to detect a lighting variation of each lighting unit;

S102: dividing the address code required for identifying into a plurality of segments, transmitting the segments to lighting units by the lighting string controller, acquiring the lighting variation of each lighting unit through the light sensor and providing location information of the lighting unit.

The lighting string location identifying method is applicable to the identification device 3. The lighting string location identifying method further stores the location information and the corresponding address code into the memory of the lighting string controller. Besides, the method can further transmit the segment according to the weighting value of the segment, determine the lighting variation after transmission, and decide whether to transmit the next segment or not. In another embodiment of the present invention, the method can further transmit the segments from the segment having the lowest weighting value to the segment having the highest weighting value.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A lighting string system, comprising a lighting string device, the light string device including:

a lighting string controller; and a plurality of lighting units, each one of the plurality of lighting units comprising a lighting portion and a controlling chip, wherein the controlling chip comprises an address code, a driving end, a controlling end, and a power end, the driving end is connected with the lighting portion, and the controlling end and the power end are connected to the lighting string controller through a power line, wherein the controlling chip is provided for acquiring controlling command information transmitted by the lighting string controller through the power line, and for comparing the controlling command information and the address code so as to determine whether to drive the lighting portion or not;

at least one light sensor configured for detecting a lighting variation of the lighting unit; and an identification device, connected with the light sensor and the lighting string controller, wherein the identification device is provided for dividing the address code of the controlling chip into segments and an address code in the controlling command information into segments, the segments divided from the address code in the controlling command information comprising a first segment and a second segment having a higher weighting value than the first segment, for transmitting the first segment from the lighting string controller to the controlling chip, for acquiring the lighting variation detected by the light sensor after the first segment transmittance, and for deciding whether to transmit the second segment according to the lighting variation.

2. The system as claimed in claim 1, wherein the lighting portion comprises a red lighting portion, a green lighting portion, or a blue lighting portion, wherein the controlling command information comprises a lighting command.

3. The system as claimed in claim 1, wherein the lighting portion is a light emitting diode (LED).

4. The system as claimed in claim 1, wherein the controlling chip determines a potential difference of the power line so as to identify a power signal and the controlling command information.

5. The system as claimed in claim 4, wherein the controlling command information is encoded according to a time interval of the power signal.

6. A lighting string location identifying system for identifying a location of the lighting unit in the lighting string device as claimed in claim 1, the system comprising:

at least one light sensor configured for detecting a lighting variation of the lighting unit; and an identification device, connected with the light sensor and the lighting string controller, wherein the identification device is provided for dividing the address code of the controlling chip into segments and an address code in the controlling command information into segments, the segments divided from the address code in the controlling command information comprising a first segment and a second segment having a higher weighting value than the first segment, for transmitting the first segment from the lighting string controller to the controlling chip, for acquiring the lighting variation detected by the light sensor after the first segment transmittance, and for deciding whether to transmit the second segment according to the lighting variation.

7. The system as claimed in claim 6, wherein the light sensor comprises a photodiode or a camera device.

8. The system as claimed in claim 6, wherein the identification device is further providing for storing the location information and the corresponding address code in a memory of the lighting string controller.

9. A method for identifying a location of a lighting unit in a lighting string device, comprising:
providing a lighting string device including:
a lighting string controller;
a plurality of lighting units, each lighting unit comprising a lighting portion and a controlling chip, wherein the controlling chip comprises an address code, a driving end, a controlling end, and a power end, the driving end is connected with the lighting portion, and the controlling end and the power end are connected to the lighting string controller through a power line;
at least one light sensor; and
an identification device, connected with the light sensor and the lighting string controller;
dividing the address code of the controlling chip into segments and an address code in the controlling command information into segments, the segments divided from the address code in the controlling command information comprising a first segment and a second segment having a higher weighting value than the first segment;
transmitting the first segment from the lighting string controller to the controlling chip;
acquiring the lighting variation detected by the light sensor after the first segment transmittance; and
deciding whether to transmit the second segment according to the lighting variation.

10. The method as claimed in claim 9 further comprising:
storing the location information and the corresponding address code into a memory of the lighting string controller.

* * * * *